(12) United States Patent
Hotham et al.

(10) Patent No.: US 10,623,579 B2
(45) Date of Patent: *Apr. 14, 2020

(54) ESTABLISHING A TELEPHONY SESSION

(71) Applicant: Metaswitch Networks Ltd., Enfield (GB)

(72) Inventors: David Hotham, Enfield (GB); Richard Underwood, Enfield (GB); Andrew Robinson Hodges, Enfield (GB)

(73) Assignee: Metaswitch Networks Ltd., Enfield (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/411,969

(22) Filed: May 14, 2019

(65) Prior Publication Data

US 2019/0268477 A1 Aug. 29, 2019

Related U.S. Application Data

(63) Continuation of application No. 16/035,229, filed on Jul. 13, 2018.

(30) Foreign Application Priority Data

Aug. 30, 2017 (GB) .................................. 1713859.5

(51) Int. Cl.
*H04L 12/28* (2006.01)
*H04M 7/00* (2006.01)
*H04L 29/06* (2006.01)

(52) U.S. Cl.
CPC ........ *H04M 7/006* (2013.01); *H04L 65/1006* (2013.01); *H04L 65/1069* (2013.01);
(Continued)

(58) Field of Classification Search
CPC ... H04M 7/006; H04L 65/1006; H04L 65/102
(Continued)

(56) References Cited

U.S. PATENT DOCUMENTS 6,977,920 B1 12/2005 Kim
7,466,810 B1 12/2008 Quon
(Continued)

FOREIGN PATENT DOCUMENTS

CN 101895947 A 11/2010
EP 0892537 A2 1/1999
(Continued)

OTHER PUBLICATIONS

No Further Objections dated Apr. 10, 2019 for GB Application No. GB1901190.7.
(Continued)

*Primary Examiner* — William J Deane, Jr.
(74) *Attorney, Agent, or Firm* — EIP US LLP

(57) ABSTRACT

Measures are provided for use in establishing a telephony session between first and second telephony devices in a telephony network. Telephony network equipment in the telephony network receives, from the first telephony device over a signalling link, a telephony session establishment request. The telephony network equipment receives, from the first telephony device over a data link that is separate to the signalling link, a message comprising data useable by the telephony network equipment to identify the second telephony device. The telephony network equipment correlates the received telephony session establishment request and the received message. The telephony network equipment transmits, to the second telephony device, a telephony session establishment request on the basis of the correlating. The first telephony device is associated with a multi-persona user having a first persona associated with a first telephony
(Continued)

identifier and a second persona associated with a second telephony identifier.

14 Claims, 4 Drawing Sheets

(52) U.S. Cl.
CPC ...... *H04L 65/1073* (2013.01); *H04L 65/4023* (2013.01); *H04M 7/0057* (2013.01); *H04L 65/102* (2013.01)

(58) Field of Classification Search
USPC ................ 379/219, 220, 225, 227, 229, 230
See application file for complete search history.

(56) References Cited

U.S. PATENT DOCUMENTS

| | | | |
|---|---|---|---|
| 9,106,742 | B2 | 8/2015 | Siegel et al. |
| 9,532,286 | B2 * | 12/2016 | Hiscock ................ H04W 36/14 |
| 9,542,076 | B1 * | 1/2017 | Onyon ................. H04L 67/306 |
| 9,615,244 | B2 | 4/2017 | Roussel |
| 9,820,116 | B2 | 11/2017 | Piscopo, Jr. |
| 2003/0039349 | A1 | 2/2003 | Crowther |
| 2004/0192386 | A1 | 9/2004 | Aerrabotu |
| 2005/0165719 | A1 | 7/2005 | Greenspan et al. |
| 2006/0227960 | A1 | 10/2006 | Hanson |
| 2007/0112962 | A1 | 5/2007 | Lewontin |
| 2008/0181379 | A1 | 7/2008 | Chow et al. |
| 2009/0164556 | A1 | 6/2009 | Siegel et al. |
| 2011/0061008 | A1 | 3/2011 | Gupta |
| 2012/0033610 | A1 | 2/2012 | Ring et al. |
| 2013/0308633 | A1 | 11/2013 | Bergkvist et al. |
| 2014/0106720 | A1 | 4/2014 | Mairs et al. |
| 2014/0148136 | A1 | 5/2014 | Thange |
| 2014/0220932 | A1 * | 8/2014 | Ring ..................... H04L 67/141 455/406 |
| 2014/0235203 | A1 * | 8/2014 | Gonsalves .......... H04L 63/0823 455/410 |
| 2016/0100053 | A1 | 4/2016 | Wong et al. |
| 2016/0234758 | A1 | 8/2016 | Qi |
| 2018/0014338 | A1 | 1/2018 | Edge et al. |
| 2018/0324265 | A1 * | 11/2018 | Macskassy ............. H04L 67/20 |

FOREIGN PATENT DOCUMENTS

| | | |
|---|---|---|
| WO | 2011025807 A1 | 3/2011 |
| WO | 2012175995 A1 | 12/2012 |
| WO | 2014046748 A1 | 3/2014 |

OTHER PUBLICATIONS

Combined Search and Examination Report dated Feb. 22, 2019 or GB Application No. GB1901190.7.
Applicant Response to CSER dated Mar. 21, 2019 for GB Application No. GB1901190.7.
Further Examination Report dated Mar. 11, 2019 for GB Application No. GB1901190.7.
Combined Search and Examination Report dated Jan. 10, 2020 on GB Application No. GB 1916120.7.

* cited by examiner

ESTABLISHING A TELEPHONY SESSION

CROSS REFERENCE TO RELATED APPLICATION(S)

This application is a continuation of U.S. patent application Ser. No. 16/035,229, filed Jul. 13, 2018, which claims the benefit under 35 U.S.C. § 119(a) and 37 CFR § 1.55 to UK patent application no. 1713859.5, filed on Aug. 30, 2018, the entire content of which is incorporated herein by reference.

BACKGROUND OF THE INVENTION

Technical Field

The present disclosure relates to establishing a telephony session. In particular, but not exclusively, the present disclosure relates to methods, apparatuses and computer programs for use in establishing a telephony session.

Background

A user of a telephony network may have multiple different personas. A persona may be considered to be an identity, role or character adopted by a user. For example, a multi-persona user may have a first, personal persona and a second, business persona. There may be scenarios in which the multi-persona user wishes to conduct telephony in relation to both personas using a single telephony user device, for example so that the user need not carry both a personal telephony user device and a business telephony user device. There are several possible approaches to providing multi-persona telephony services and various considerations to be taken into account in using any such approach. Examples of such considerations include, but are not limited to, call quality, ease of call setup, latency of call setup, reliability of call setup, and complexity of telephony user devices that can be used in such approaches.

SUMMARY

According to first embodiments, there is provided a method for use in establishing a telephony session between first and second telephony devices in a telephony network, the method comprising, at telephony network equipment in the telephony network: receiving, from the first telephony device over a signalling link, a telephony session establishment request; receiving, from the first telephony device over a data link that is separate to the signalling link, a message comprising data useable by the telephony network equipment to identify the second telephony device; correlating the received telephony session establishment request and the received message; and transmitting, to the second telephony device, a telephony session establishment request on the basis of said correlating, wherein the first telephony device is associated with a multi-persona user having a first persona associated with a first telephony identifier and a second persona associated with a second telephony identifier.

According to second embodiments, there is provided a method for use in establishing a telephony session between first and second telephony devices in a telephony network, the method comprising, at the first telephony device: transmitting, to telephony network equipment in the telephony network over a signalling link, a telephony session establishment request; transmitting, to the telephony network equipment via a data link that is separate to the signalling link, a message comprising data useable by the telephony network equipment to identify the second telephony device; and conducting telephony with the second telephony device via the telephony session, the telephony session having been established on the basis of the transmitted telephony session establishment request and the transmitted message, wherein the first telephony device is associated with a multi-persona user having a first persona associated with a first telephony identifier and a second persona associated with a second telephony identifier.

Further features and advantages will become apparent from the following description, given by way of example only, which is made with reference to the accompanying drawings.

DETAILED DESCRIPTION OF CERTAIN INVENTIVE EMBODIMENTS

Figure 1:
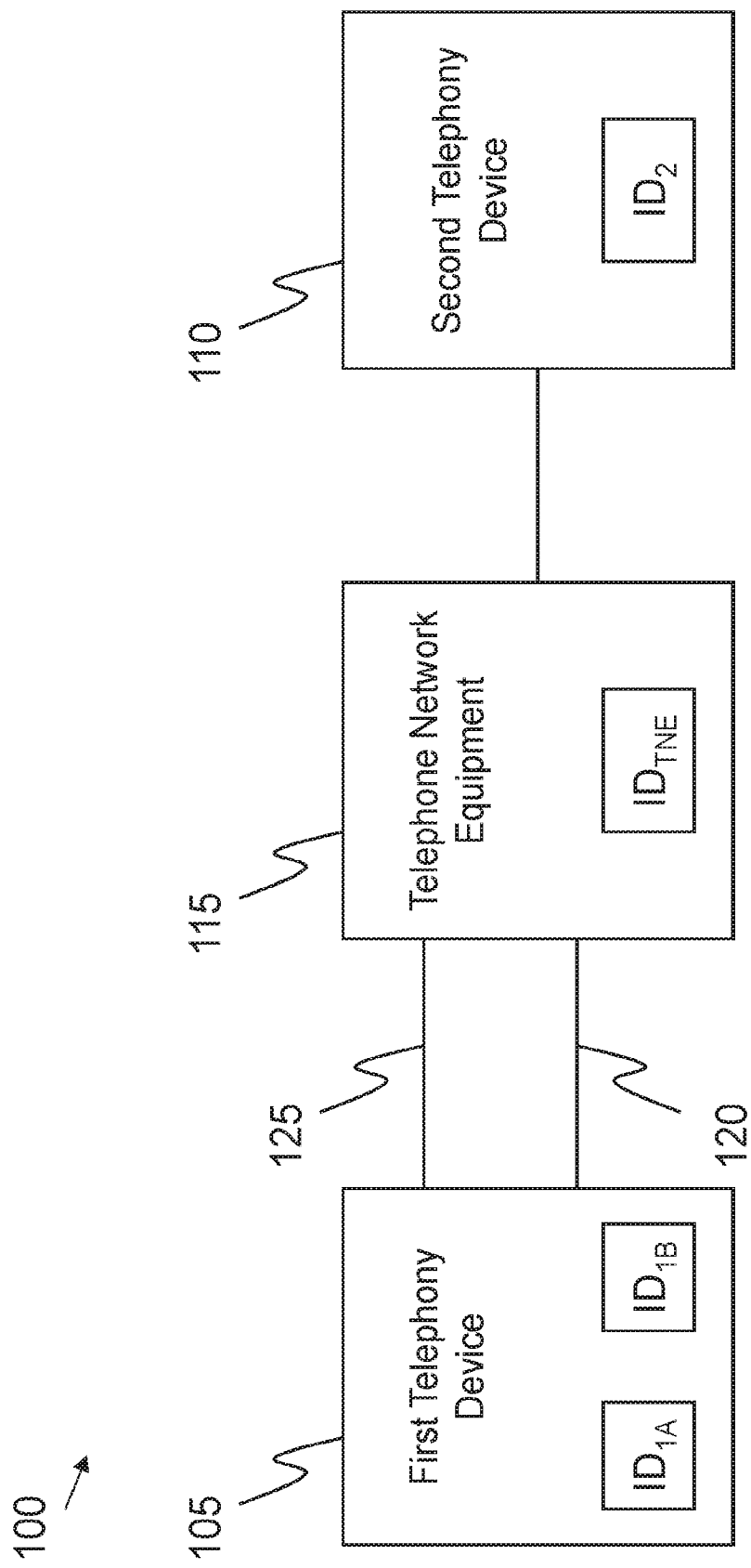
FIG. 1 shows a schematic block diagram representing an example of a telephony network.

Referring to FIG. 1, there is shown schematically an example of a telephony network 100.

A telephony network (also referred to as a 'telephone network') is a type of telecommunications network in which telephony sessions (also referred to as 'telephone calls' or 'calls') can be established and telephony can be conducted between two or more users of the telephony network. Such users may be known as 'entities', 'parties', 'subscribers' or 'end users'. A telephony session may be established between a calling party and a called party. A telephony session may involve a voice call and/or a video call.

In this example, the telephony network 100 comprises apparatuses in the form of first and second telephony devices 105, 110 and apparatus in the form of telephony network equipment 115. It will be appreciated that, in reality, a telephony network may comprise more telephony devices and/or more telephony network equipment than in the example telephony network 100.

The first and second telephony devices 105, 110 and/or the telephony network equipment 115 may comprise one or more processors and one or more memories. One or more computer programs comprising computer-readable instructions may be stored in the one or more memories. The one or more processors may be configured to execute the computer-readable instructions and perform at least some of the methods and techniques described herein as result.

In the examples described herein, the first and second telephony devices 105, 110 are both telephony user devices (also referred to as 'endpoints', 'endpoint devices' and 'subscriber devices'), it being understood that one or both of the first and second telephony devices 105, 110 may not be telephony user devices. An example of a telephony device that is not a telephony user device is a voicemail server. Telephony user devices are used by users of the telephony network and may take various different forms. Examples of telephony user devices include, but are not limited to, mobile (also referred to as 'cellular') telephones, smartphones, tablet computing devices, laptop computing devices, desktop computing devices, in-vehicle entertainment systems and smart watches. In this specific example, the first telephony user device 105 is associated with a first user and the second telephony user device 110 is associated with a second, different user. In other examples, the first and second telephony user devices 105, 110 are associated with the same user.

In this example, the first user (associated with the first telephony user device 105) is a multi-persona user. The first user has multiple personas, including first and second personas. The first user may have more than two personas. For example, the first user may have a first persona and one or more additional personas including, at least, a second persona. The first and second personas are associated with one or more telephony service providers. A telephony service provider provides a telephony service to the first user. Examples of telephony service providers include, but are not limited to, mobile network operators and non-mobile network operators. The first and second personas of the first user may be associated with first and second, different telephony service providers respectively (for example a mobile network operator and a non-mobile network operator respectively). Alternatively, the first and second personas of the first user may be associated with the same telephony service provider as each other. The first user may have a first account associated with the first persona and a second account associated with the second persona. Both accounts may be with the same telephony service provider where the same telephony service provider is associated with the first and second personas, or the first account may be associated with the first telephony service provider and the second account may be associated with the second telephony service provider where the first and second accounts are associated with first and second telephony service providers respectively. The first account, which is associated with the first persona, may be associated with a first telephony identifier $ID_{1A}$. The second account, which is associated with the second persona, may be associated with a second telephony identifier $ID_{1B}$. Examples of telephony identifiers include, but are not limited to, telephone numbers, telephony service usernames and Session Initiation Protocol (SIP) Uniform Resource Indicators (URIs). The first and second accounts may be associated with the same type of telephony service, or may be associated with different types of telephony services. Examples of such telephony services include, but are not limited to, landline telephony services, mobile telephony services, mobile Voice over Internet Protocol (VoIP) telephony services and non-mobile VoIP telephony services.

The first persona may be a personal persona and the second persona may be a business persona. However, the first and second personas need not be personal and business personas respectively. For example, the first and second personas could both be personal personas, the first and second personas could both be business personas, the first persona may not be a personal persona and the second persona may not be a business persona.

The first telephony user device 105 is associated with the first telephony identifier $ID_{1A}$. For example, the first telephony user device 105 may be the primary device the first user uses for calls using the first account, with which the first telephony identifier $ID_{1A}$ is associated.

The second telephony user device 110 is associated with a further telephony identifier $ID_2$.

The telephony network equipment 115 may take various different forms. In some examples, the telephony network equipment 115 is in the form of a telephony application server (TAS). A TAS is an entity in a telephony network that carries out functions not directly related to routing of messages in the network. Examples of such functions include, but are not limited to, automatic call forwarding functions and conference bridge functions. Where the telephony network 100 comprises an Internet Protocol Multimedia Subsystem (IMS) core, the TAS may be an IMS-TAS located behind the IMS core. As such, the IMS core may be configured with a trigger such that processing at the IMS-TAS is invoked for at least some telephony sessions involving the first user. Alternatively, the TAS may be a legacy (also referred to as a 'non-IMS') TAS, for example where the telephony network 100 does not comprises an IMS core. An example of such a TAS is the MetaSphere® Multiservice Telephony Application Server (MTAS) available from Metaswitch Networks Ltd. In some examples, the telephony network equipment 115 is in the form of a gateway. A gateway is an entity in a telephony network that interfaces multiple different networks that use different protocols. For example, the telephony network equipment 115 may be implemented as a gateway that sits between a Public Switched Telephone Network (PSTN) and an IMS core. Implementing the telephony network equipment 115 as a gateway may allow the telephony network equipment 115 to integrate more easily with an IMS core than would be the case with a TAS. The gateway may be able to work with different types of telephony switch. The telephony network equipment 115 may serve a public telephony network, in other words a telephony network that is accessible to the public. A public telephony network differs from a private telephony network such as a corporate telephony network, which only users associated with the corporation can access.

The telephony network equipment 115 is associated with a telephony network equipment identifier $ID_{TNE}$. The telephony network equipment identifier $ID_{TNE}$ may, for example, be in the form of a telephone number, telephony service username or a SIP URI. The telephony network equipment 115 may be associated with multiple telephony network equipment identifiers. The telephony network equipment identifiers may relate to different geographical locations. For example, one telephony network equipment identifier may be used when the first user is in a home country and another telephony network equipment identifier may be used when the first user is roaming.

The telephony network equipment identifier $ID_{TNE}$ may be a preconfigured identifier to be used by the first telephony user device 105 in telephony session establishment requests when the first telephony user device 105 determines that the first user desires to establish the telephony session with the second telephony user device 110 based on the second persona.

One or more telephony network equipment identifiers $ID_{TNE}$ may be reserved for use by a given user of the telephony network 100, for example the first user. For example, the first user may be associated with one or more telephony network equipment identifiers $ID_{TNE}$ such that telephony session establishment requests directed to the one or more telephony network equipment identifiers $ID_{TNE}$ can be determined to relate to the first user. As such, the telephony network equipment 115 may be able to determine that a telephony session setup request originates from the first user if the telephony session setup request is directed to a telephony network equipment identifier $ID_{TNE}$ associated with the first user, even if the telephony session setup request does not include other data identifying the first user (for example if calling party identification is withheld).

Alternatively, a given telephony network equipment identifier $ID_{TNE}$ may be useable by several, for example all, users of the telephony network 100. As such, fewer telephony network equipment identifier $ID_{TNE}$ may be reserved for the purposes described herein.

As indicated above, there are several possible approaches to providing multi-persona telephony services and various related considerations. In particular, there are several possible approaches to providing multi-persona telephony services in which the first user can conduct telephony in relation to the first and second personas using the first telephony user device 105, so that outgoing calls can be made to appear to be from the first or second persona and/or in which incoming calls made in relation to the first or second persona can be received by the first telephony user device 105. In the examples described herein, it is assumed that one of the first user and the second user wishes to speak to the other of the first user and the second user and, as such, that a telephony session is to be established between the first telephony user device 105 and the second telephony user device 110.

One possible approach, for outgoing calls where the first user desires to speak to the second user using the first telephony user device 105 and the second persona, would be for the first telephony user device 105 to transmit a telephony session establishment request with the called party identifier set as the further telephony identifier $ID_2$ and the calling party identifier set as the second telephony identifier $ID_{1B}$. This may be possible where, for example, the first account is associated with a first Subscriber Identity Module (SIM) card and the second account is associated with a second SIM card and where the first telephony user device 105 is a dual-SIM telephony user device. However, dual-SIM telephony user devices may be relatively large and expensive compared to single-SIM devices. Further, a dual-SIM telephony user device may not be suitable where the second account is associated with a non-mobile telephony service provider that does not issue SIM cards (for example a VoIP service provider such as Skype™).

Another possible approach, for outgoing calls where the first user desires to speak to the second user using the first telephony user device 105 and the second persona, would be for the first telephony user device 105 to append the further telephony identifier $ID_2$ to the telephony network equipment identifier $ID_{TNE}$ and to transmit a telephony session establishment request with the called party identifier set as a combined identifier $ID_{TNE}+ID_2$. As such, the further telephony identifier $ID_2$ would be signalled in-band with the telephony network equipment identifier $ID_{TNE}$. However, restrictions on the length and format of called party identifiers in signalling flows (for example within a PSTN) and the potential inability of the PSTN to route such called party identifiers mean that, in practice, such call setup attempts may not be effective.

Another possible approach, for outgoing calls where the first user desires to speak to the second user using the first telephony user device 105 and the second persona, would be for the first telephony user device 105 to conduct telephony in relation to the first account using a first connection, for example a circuit-switched telephony connection, and to conduct telephony in relation to the second account using a second, separate connection, for example a packet-switched data connection. This may be effective where, for example, the first account is associated with a mobile service provider and the second account is associated with a non-mobile service provider (for example a VoIP telephony service provider). For example, a native dialler function on the first telephony user device 105 may be able to conduct communications using the circuit-switched telephony connection and another function on the first telephony user device 105, such as a standalone application and/or a function that integrates with the native dialler function, may be able to conduct communications using the packet-switched data connection. However, such an approach would rely on the packet-switched data connection for transmission and reception of voice data. As such, the quality of the media would be dependent on the availability and service quality of the packet-switched data connection, which may result in lower call quality than where a circuit-switched telephony connection is used.

Another possible approach, for outgoing calls where the first user desires to speak to the second user using the first telephony user device 105 and the second persona, would be for the first telephony user device 105 to include a given symbol, such as the number '9', in the called party identifier of a telephony session establishment request when making a call in relation to the second persona using a connection (such as a circuit-switched telephony connection) associated with the first account. The first telephony user device 105 could automatically include the given symbol in outgoing telephony session establishment requests related to the second account such that the first user need not remember to do so manually. However, such an approach may be restricted to implementations in which the service provider associated with the second account is the same as the service provider associated with the first account. This may not enable multi-persona telephony where, for example, the service provider associated with the first account is a mobile telephony service provider and the service provider associated with the second account is a non-mobile telephony service provider (for example a VoIP service provider).

Another possible approach, for outgoing calls where the first user desires to speak to the second user using the first telephony user device 105 and the second persona, would be for the first user to use a calling card service. The calling card service may allow the first user to make outgoing calls using the first account appear to be from the second account in a manner that is not integrated within the native dialler function of the first telephony user device 105. To make such an outgoing call, the first user would first dial an access phone number associated with the calling card operator. The first user would then be presented with an Interactive Voice Response (IVR) menu via which they can enter the further telephony identifier $ID_2$, as well as a Personal Identification Number (PIN). The user experience could be made more seamless by having the native dialler function of the first telephony user device 105 dial the access phone number, pause, and then enter the further telephony identifier $ID_2$ automatically for example via dual-tone multi-frequency (DTMF) signalling. However, use of a calling card service can result in an unacceptably long delay in setting up an outgoing call. Further, calling cards may not offer support for handling incoming calls, and not in a way in which an incoming call can be distinguished as being associated with the second account.

Another possible approach, for outgoing calls where the first user desires to speak to the second user using the first telephony user device 105 and the second persona, would be for the first telephony user device 105 to request callback from the telephony network equipment 115, via telephony signalling or via a separate data connection (for example based on Hypertext Transfer Protocol (HTTP) or HTTP Secure (HTTPS)). The telephony network equipment 115 would reject the incoming call if the telephony signalling approach is used, or would process the callback request if received via the separate data connection, and would transmit a telephony session establishment request to the first telephony user device 105. The first telephony user device 105 would answer the incoming call from the telephony network equipment 115 and would provide the further telephony identifier $ID_2$ to the telephony network equipment 115 in-band, for example via DTMF signalling. The telephony network equipment 115 would then join the call legs it establishes with the first telephony user device 105 and the second telephony user device 110, when the second telephony user device 110 accepts the call, to establish the telephony session between the first and second telephony user devices 105, 110. However, as indicated above, providing the further telephony identifier $ID_2$ to the telephony network equipment 115 via DTMF introduces a delay into the call establishment procedure. Further, such a solution may involve the use of an application separate to a native dialler application, may involve use of a Hosted Private Branch Exchange (HPBX) which may provide a limited feature set for corporate users of a private telephony network only (as opposed to providing services to users of a public telephony network), and may not allow for separation of voicemail for multi-persona users.

In one approach, for incoming calls where the second user desires to speak to the first user based on the second persona of the first user, the telephony network equipment 115 receives an incoming telephony session establishment request from the second telephony user device 110 with the called party identifier set as the second telephony identifier $ID_{1B}$ and the calling party identifier set as the further telephony identifier $ID_2$. The telephony network equipment 115 would then set the calling party identifier in a telephony session establishment request to the first telephony user device 105 as a combination of the telephony network identifier $ID_{TNE}$ and the further telephony identifier $ID_2$, for example $ID_{TNE}+ID_2$. The first telephony user device 105 could then determine that the incoming call relates to the second persona on the basis that the telephony session establishment request has been received from the telephony network equipment 115 and could extract the further telephony identifier $ID_2$ from the calling party identifier in the telephony session establishment request. If it is known that the first account does not have voicemail or any other automated service that may answer an incoming call and/or if it is acceptable for a voicemail system associated with the first account to be used for calls relating to the second persona, then this may be an acceptable solution. However, where the first user desires to keep a separation between voicemails relating to the first and second personas, then such an approach may not be acceptable, since the telephony network equipment 115 may not be able to disambiguate between the first user manually accepting the telephony session establishment request on the first telephony user device 105 and the telephony session establishment request being automatically forwarded to a voicemail system associated with the first account which then automatically accepts the telephony session establishment request.

Measures (for example methods, apparatuses and computer programs) are provided herein for use in establishing a telephony session between the first and second telephony user devices 105, 110 in the telephony network 100.

A telephony session establishment request is transmitted to establish a telephony session 120 between the first telephony user device 105 and the telephony network equipment 115. The telephony session establishment request may take various different forms. For example, the telephony session establishment request may be in the form of a SIP INVITE message. The telephony session establishment request may be transmitted by the first telephony user device 105 and received by the telephony network equipment 115, for example for outgoing calls from the first telephony user device 105, or may be transmitted by the telephony network equipment 115 and received by the first telephony user device 105, for example for incoming calls to the first telephony user device 105. The telephony session establishment request is transmitted over a signalling link. The signalling link may be a SIP signalling link or otherwise.

The telephony session establishment request may comprise data useable by a recipient of the telephony session establishment request (for example the first telephony user device 105 or the telephony network equipment 115) to identify the first telephony identifier $ID_{1A}$ and/or data useable by a recipient of the telephony session establishment request (for example the first telephony user device 105 or the telephony network equipment 115) to identify the telephony network equipment identifier $ID_{TNE}$. Such data may be useable by entity other than the first telephony user device 105 or the telephony network equipment 115 to identify the first telephony identifier $ID_{1A}$ and/or the telephony network equipment identifier $ID_{TNE}$. An example of another such entity is a network node intermediate the first telephony user device 105 and the telephony network equipment 115. For example, the intermediate network node may receive data useable to identify the first telephony identifier $ID_{1A}$ and may output the first telephony identifier $ID_{1A}$ (or data useable to identify the first telephony identifier $ID_{1A}$ as the case may be).

The telephony session establishment request may not comprise data useable by a recipient of the telephony session establishment request (for example the first telephony user device 105 or the telephony network equipment 115) to identify the first telephony identifier $ID_{1A}$ where the recipient can identify the first telephony identifier $ID_{1A}$ in another manner and/or does not need to identify the first telephony identifier $ID_{1A}$. For example, the telephony network equipment 115 may be able to identify the first telephony identifier $ID_{1A}$ from the particular telephony network identifier $ID_{TNE}$ used, for example as a called party identifier, if that particular telephony network identifier $ID_{TNE}$ is associated with the first telephony identifier $ID_{1A}$.

The telephony session establishment request may not comprise data useable by a recipient of the telephony session establishment request data useable by a recipient of the telephony session establishment request (for example the first telephony user device 105 or the telephony network equipment 115) to identify the telephony network equipment identifier $ID_{TNE}$ where the recipient can identify the telephony network equipment identifier $ID_{TNE}$ in another manner and/or does not need to identify the telephony network equipment identifier $ID_{TNE}$. For example, the first telephony user device 105 may be physically connected to a particular port of the telephony network equipment 115 such that the first telephony user device 105 need not include the telephony network equipment identifier $ID_{TNE}$ in the telephony session establishment request, for example as a called party identifier.

A message is transmitted via a data link 125. The data link 125 is between the first telephony user device 105 and the telephony network equipment 115 and is separate to the signalling link over which the telephony session establishment request is transmitted. The data link 125 may be established before the telephony session 120 is established. The data link 125 may, for example, be based on SIP, HTTP, HTTPS etc. The message may be transmitted by the first telephony user device 105 and received by the telephony network equipment 115, for example for outgoing calls from the first telephony user device 105, or may be transmitted by the telephony network equipment 115 and received by the first telephony user device 105, for example for incoming calls to the first telephony user device 105. The message may comprise data useable by the recipient of the message (for example the first telephony user device 105 or the telephony network equipment 115) to identify the further telephony identifier $ID_2$ (for example the further telephony identifier $ID_2$ itself). In other examples, the recipient may be able to determine or infer the further telephony identifier $ID_2$ in another manner, for example if calls involving a further telephony identifier $ID_2$ have historically been made at the same or substantially the same time of day over a given period. The message may comprise other data. Examples of such other data include, but are not limited to, data useable by the recipient of the message to identify the first telephony identifier $ID_{1A}$ (for example the first telephony identifier $ID_{1A}$ itself), data useable by the recipient of the message to identify the second telephony identifier $ID_{1B}$ (for example the second telephony identifier $ID_{1B}$ itself) and data useable by the recipient of the message to identify the telephony network equipment identifier $ID_{TNE}$ (for example the telephony network equipment identifier $ID_{TNE}$ itself). The message is transmitted via the data link 125, out-of-band (also referred to as 'over-the-top (OTT)') in relation to the signalling link. The message comprises data that can be used to establish a telephony session between the first and second telephony user devices 105, 110 (even if such a telephony session is not in fact established) and, as such, may be considered to be telephony session setup information. However, such telephony session setup information relates to a telephony session between the first and second telephony user devices 105, 110 whereas the telephony session establishment request transmitted between the first telephony user device 105 and the telephony network equipment 115 relates to the telephony session 120 between the first telephony user device 105 and the telephony network equipment 115.

As explained above, a telephony session establishment request is transmitted or received over a signalling link and a message is transmitted or received over a data link 125 that is separate to the signalling link. The telephony session establishment request may be transmitted (or received) before, after, or at the same time as the message is transmitted (or received). As such, unless expressly indicated otherwise, references to transmitting (or receiving) a telephony session establishment request over a signalling link and to transmitting (or receiving) a message over a data link that is separate to the signalling link, should be understood to include these different possibilities. Further, in some examples, an apparatus transmits the message in response to receiving another message (for example from apparatus to which the message is transmitted). In other examples, an apparatus does not transmit the message in response to receiving another message (for example from apparatus to which the message is transmitted).

In the case of incoming calls to the first telephony user device 105, the first telephony user device 105 can use the data comprised in the telephony session establishment request and/or the data comprised in the message to determine that the telephony session establishment request relates to the second persona, for example on the basis of the telephony session establishment request having the telephony network equipment identifier $ID_{TNE}$ as the calling party identifier, and to identify the caller, namely the second user, to the first user, for example on the basis of inclusion of data useable to identify the further telephony identifier $ID_2$ in the message.

In the case of outgoing calls from the first telephony user device 105, the telephony network equipment 115 can use the data comprised in the telephony session establishment request and the data comprised in the message to determine that the telephony session establishment request relates to the second persona, for example on the basis of the telephony session establishment request having the telephony network equipment identifier $ID_{TNE}$ as the called party identifier, and to identify the party with which the first user wishes to speak, namely the second user, for example on the basis of the inclusion of data useable to identify the further telephony identifier $ID_2$ in the message.

As such, in accordance with examples described herein, carrier-quality audio may be provided for both incoming and outgoing calls for multi-persona users that have an account with a mobile network operator. For example, calls relating to both the first and second personas may be conducted using a cellular, circuit-switched connection where the user has an account with a mobile network operator. Further, non-mobile telephony service providers may still provide carrier-quality audio by making use of a cellular connection. Automated setup of outgoing calls may also be provided, in contrast to use of some calling card services which involve user interaction with an IVR to enter a target phone number. As will be described in more detail below, the likelihood of calls associated with the second persona (such as non-personal, business calls) being sent to a voicemail service associated with the first persona of the user (such as a voicemail system associated with a personal account) may be reduced. Such features may enhance user experience. Examples described herein may provide multi-persona unified communications (UC) solutions for both mobile operators and non-mobile operators. As such, examples described herein can provide mobile-VoIP converged UC.

Figure 2:
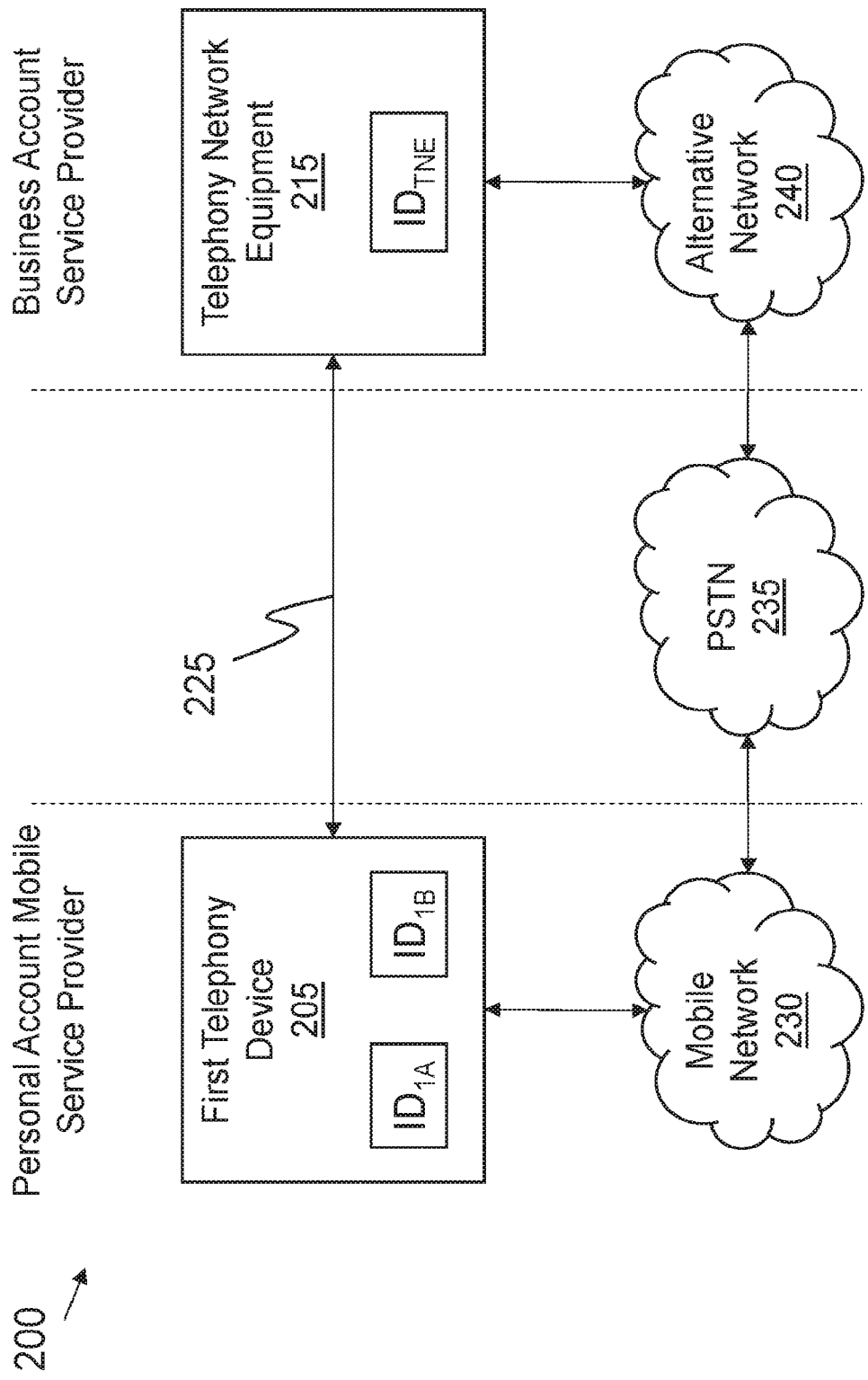
FIG. 2 shows a schematic block diagram representing another example of a telephony network.

Referring to FIG. 2, there is shown schematically another example of a telephony network 200. The telephony network 200 comprises some elements that are the same as, or are similar to, elements in the example telephony network 100 described above with reference to FIG. 1. Such elements are indicated in FIG. 2 using the same reference signs as those used in FIG. 1, but incremented by 100.

In this example, the telephony network 200 comprises a mobile network 230, a PSTN 235 and an alternative network 240. In this example, the telephony session establishment request is transmitted via the mobile network 230, the PSTN 235, and the alternative network 240. Whether the telephony session establishment request is transmitted via the mobile network 230, and then via the PSTN 235, and then via the alternative network 240 or vice versa depends on whether the telephony session establishment request is for an incoming call or for an outgoing call from the perspective of the first telephony user device 205. A data link 225 can be established between the first telephony user device 205 and the telephony network equipment 215.

The telephony network 200 may be used to provide multi-persona telephony for the first user via a single cellular connection associated with the first persona. In particular, the first user may be able to make and receive calls in relation to a second account associated with the alternative network 240 using the cellular connection related to the first account. As explained above, the first and second accounts may be provided by the same or different telephony service provider networks. As such, multiple accounts may be consolidated onto one telephony user device.

Figure 3:
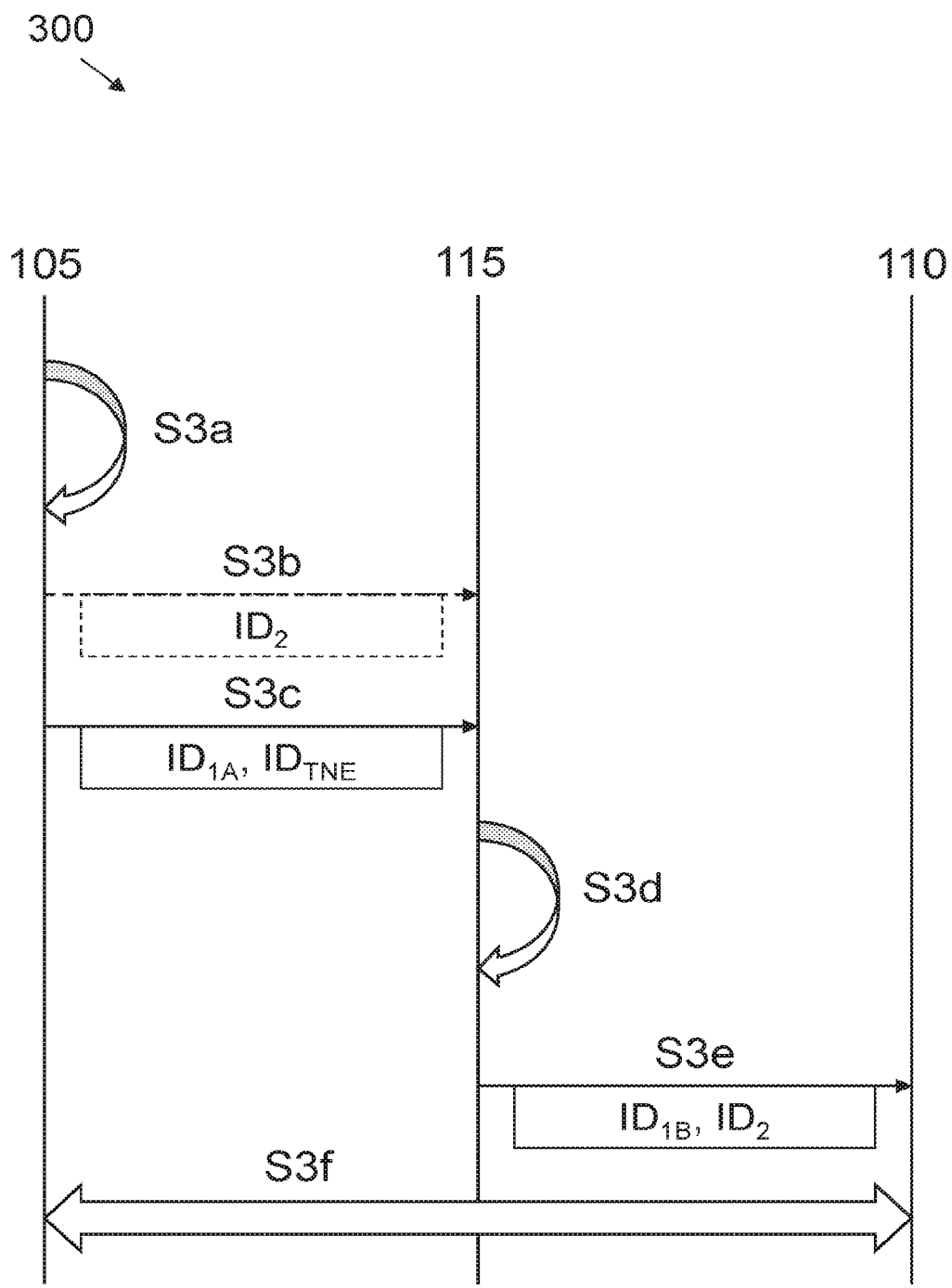
FIG. 3 shows a sequence diagram representing an example of a method.

Referring to FIG. 3, there is shown an example method 300 for use in establishing a telephony session between first and second telephony user devices. In this example, the method 300 is performed in the example network 100 described above with reference to FIG. 1. The method 300 may however be performed in the example network 200 described above with reference to FIG. 2.

In this example, the method 300 corresponds to the first user making an outgoing call to the second telephony user device 110.

At item S3a, the first telephony user device 105 determines that the first user desires to establish the telephony session with the second telephony user device 110 based on the second persona. The first telephony user device 105 may make such a determination based on one or more factors. An example factor is the location of the first telephony user device 105 being associated with the second persona, for example the second persona being a business persona and the first user being at a known work location. Another example factor is the second user being associated with the second persona, for example the second persona being a business persona and the second user being a business contact. Another example factor is the first user initiating a telephony session establishment using a predetermined function on the first telephony user device 105 associated with the second persona, for example the second persona being a business persona and the predetermined function being a business dialler function. Another example factor is the time or day and/or day of week at which the first user wishes to establish the telephony session being associated with the second persona, for example the second persona being a business persona and the first user initiating the telephony session during working hours. Another example factor is the inclusion of a predetermined symbol in a telephony identifier provided for the second user, for example the presence of the number '9' at the start of the telephony identifier provided for the second user to indicate that the second user is associated with the second persona. Another example factor is the second user being in a group of contacts in an address book on the first telephony user device 105 associated with the second persona, for example the second persona being a business persona and the second user being in a business contact address book. Another example factor is the first telephony user device 105 being in an operating mode associated with the second persona, for example the second persona being a business persona and the first telephony user device 105 being in a business operating mode.

At item S3b, the first telephony user device 105 transmits a message via the data link 125 that is separate to the signalling link over which the telephony session establishment request is transmitted at item S3c below. The data link 125 being separate to the signalling link does not imply that the telephony session 120 has been or will be established. The message comprises data useable to identify the further telephony identifier $ID_2$. The data useable to identify the further telephony identifier $ID_2$ may comprise the further telephony identifier $ID_2$ itself. Alternatively or additionally, the telephony network equipment 115 may be able to map the data useable to identify the further telephony identifier $ID_2$ to the further telephony identifier $ID_2$. The message may comprise data useable to identify the first telephony identifier $ID_{1A}$ (for example the first telephony identifier $ID_{1A}$ itself), and/or the telephony network equipment 115 may be able to determine that the message originates from the first telephony user device 105 and/or relates to the first user in another manner (for example based on other data in the message or data external to the message). The message of item S3b may indicate that the first user wishes to call the second user on the basis of the second persona. The second telephony identifier $ID_{1B}$ associated with the second persona may already be known to the telephony network equipment 115. As such, the second telephony identifier $ID_{1B}$ may not explicitly be included in the message. For example, the relationship between the first user and the second persona and/or the second telephony identifier $ID_{1B}$ might have been declared by the first user or by operator configuration (and not under the control of the first user), for example long prior to call setup. The operator configuration approach may be used to deny the first user the ability to do arbitrary identity spoofing.

The telephony network equipment 115 may transmit an acknowledgement message (not shown in FIG. 3) to the first telephony user device 105 to confirm receipt of the message. In response to receiving the acknowledgement message from the telephony network equipment 115, the first telephony user device 105 can determine that the telephony network equipment 115 is able to note the entity with whom the first user wishes to speak. The acknowledgement message could provide the first telephony user device 105 with information useable subsequently in establishing the telephony session. For example, the acknowledgement message could provide the first telephony user device 105 with data useable to identify the telephony network equipment identifier $ID_{TNE}$ (for example the telephony network equipment identifier $ID_{TNE}$ itself). As such, the telephony network equipment 115 may be able to obtain the telephony network equipment identifier $ID_{TNE}$ on-demand.

At item S3c, the first telephony user device 105 transmits a telephony session establishment request over the signalling link. The telephony session establishment request comprises a request to establish the telephony session 120 between the first telecommunications device 105 and the telecommunications network equipment 115. The telephony session 120 may or may not, in fact, be established between the first telecommunications device 105 and the telecommunications network equipment 115 at this stage. The telephony session establishment request may comprise data useable to identify the first telephony identifier $ID_{1A}$ (for example the first telephony identifier $ID_{1A}$ itself) and/or data useable to identify the telephony network equipment identifier $ID_{TNE}$ (for example the telephony network equipment identifier $ID_{TNE}$ itself). The telephony session establishment request may, for example, be transmitted from the first telephony user device 105 to the telephony network equipment 115 via a mobile network, a PSTN and an IMS core. The telephony user device 105 may display the further telephony identifier $ID_2$ and/or data identifying the second user, instead of the telephony network equipment identifier $ID_{TNE}$, via an in-call user interface (UI). As such, the involvement of the telephony network equipment 115 in establishing the telephony session may be transparent to the first user.

Although in this example, the message of item S3b is transmitted before the telephony session establishment request of item S3c, several alternative approaches could be taken. For example, the telephony session establishment request of item S3c may be transmitted prior to, or at the same time as, the message of item S3b. The telephony network equipment 115 may receive the telephony session establishment request of item S3c and may await the message of item S3b to determine that the telephony session is to be established with the second telephony user device 110. The message of item S3b may be transmitted proactively by the first telephony user device 105 or may be transmitted reactively in response to the first telephony user device 105 receiving a message from the telephony network equipment 115 requesting data identifying the called party. The telephony network equipment 115 may be able to request such data from the first telephony user device 105 over the data link via a push notification (for example using the Apple Push Notification Service (APNs)), or via a return path that has been built up by the first telephony user device 105 previously registering (and re-registering as it moved around), as is done in SIP.

At item S3d, the telephony network equipment 115 correlates data comprised in the telephony session establishment request received from the first telephony user device 105 at item S3b with data comprised in the message received from the first telephony user device 105 at item S3c and determines that the first user desires to establish the telephony session with the second telephony user device 110 based on the second persona. For example, where the message transmitted via the data connection 125 and the telephony session establishment request comprise the first telephony identifier $ID_{1A}$, the telephony network equipment 115 can correlate the first telephony identifier $ID_{1A}$ comprised in the message with the first telephony identifier $ID_{1A}$ comprised in the telephony session establishment request to determine that both relate to the first user, and identify the called party based on the inclusion of the second telephony identifier $ID_2$ (or data useable to identify the second telephony identifier $ID_2$) in the message. The correlation performed by telephony network equipment 115 in relation to the telephony session establishment request of item S3b and the message of item S3c may be temporal, for example where the telephony session establishment request and the message can be assumed to be from the same source if they are received within a predetermined time period of each other. This may be possible where the telephony network 100 includes a relatively small number of users and/or when calls in the telephony network 100 are relatively infrequent such that the likelihood of two calls being made at the same time is sufficiently low.

At item S3e, the telephony network equipment 115 transmits an outgoing telephony session establishment request to the second telephony user device 110 based on the telephony session establishment request received from the first telephony user device 105 at item S3b and the message received from the first telephony user device 105 at item S3c. The outgoing telephony session establishment request may comprise data useable to identify the further telephony identifier $ID_2$ (for example the further telephony identifier $ID_2$ itself) and/or data useable to identify the second telephony identifier $ID_{1B}$ (for example the second telephony identifier $ID_{1B}$ itself). The telephony network equipment 115 may transmit the outgoing telephony session establishment request to the second telephony user device 110 via an IMS core. Originating call services provided by the IMS core may therefore be invoked.

At item S3f, a telephony session is established between the first and second telephony user devices 105, 110. Voice and/or video data may for example be communicated via the telephony session.

In some examples, where the first telephony user device 105 determines, at item S3a, that the multi-persona user desires to establish the telephony session with the second telephony user device 110 based on the first persona (as opposed to the second persona), the first telephony user device 105 conducts telephony session establishment in a conventional manner, for example by transmitting a telephony session establishment request with the calling party identifier being the first telephony identifier $ID_{1A}$ and the called party identifier being the further telephony identifier $ID_2$, rather than the called party identifier being the telephony network equipment identifier $ID_{TNE}$.

In some examples, where the first telephony user device 105 is unable, at item S3b, to transmit the message via the data link 125 (for example where there is insufficient data connectivity), the first telephony user device 105 provides the first user with an option to establish the telephony session with the second user on the basis of the first persona instead of on the basis of the second persona. In other examples, where the first telephony user device 105 is unable, at item S3b, to transmit the message via the data link 125, the first telephony user device 105 automatically establishes the telephony session with the second user on the basis of the first persona instead of on the basis of the second persona. The first telephony user device 105 may establish the telephony session automatically in that the first telephony user device 105 may not provide the first user with an option to establish the telephony session with the second user on the basis of the first persona and/or may not require user input in order to establish the telephony session with the second user on the basis of the first persona. As such, a fallback mechanism is provided to allow the first user to speak to the second user, for example in response to predetermined user input or automatically.

In this example, the decision about which persona to use for a telephony session is made on the first telephony user device 105, for example automatically and/or by the user selecting a preferred persona manually. Additionally or alternatively, the decision about which persona to use could be made by the telephony network equipment 115. For example, the first telephony user device 105 could direct all outgoing telephony session establishment requests to the telephony network equipment 115 and the telephony network equipment 115 could decide which persona to use, either autonomously or based on feedback from the first telephony user device 105 and/or the first user.

As such, for outgoing calls, the user dials the further telephony identifier $ID_2$, for example using a native dialler function on the first telephony user device 105, or using a predetermined function (such as a software application) on the first telephony user device 105 that the first user uses for outgoing calls related to the second persona. An intercepting function on the first telephony user device 105 intercepts the outgoing call. The intercepting function may be separate from the native dialler function. The intercepting function may be part of the predetermined function that the first user uses for outgoing calls related to the second persona. The intercepting function transmits the message to the telephony network equipment 115 via the data link 125 to indicate that the first user wishes to dial the second user having the further telephony identifier $ID_2$. Examples described herein may make use of Android ConnectionService to place calls using a native dialler. Integration with Android for Work may provide separation of multiple personas on a device. Instead of transmitting the telephony session establishment request with the further telephony identifier $ID_2$ as the called party identifier, the first telephony user device 105 places an outgoing call to the telephony network equipment 115 over the signalling link that is separate from the data link 125. The telephony network equipment 115 receives the call request from the first telephony user device 105, may correlate the incoming caller identifier, namely the first telephony identifier $ID_{1A}$, with the second telephony identifier $ID_{1B}$ associated with the first user and with the message received via the data link 125 to find out that the first user is trying to call the further telephony identifier $ID_2$ and initiates a new call to the further telephony identifier $ID_2$. The telephony network equipment 115 may join the two legs of the telephony session, namely the first telephony session leg between the first telephony user device 105 and the telephony network equipment 115 and the second telephony session leg between the telephony network equipment 115 and the second telephony user device 110, such that the telephony session is established between the first telephony user device 105 and the second telephony user device 110.

Figure 4:
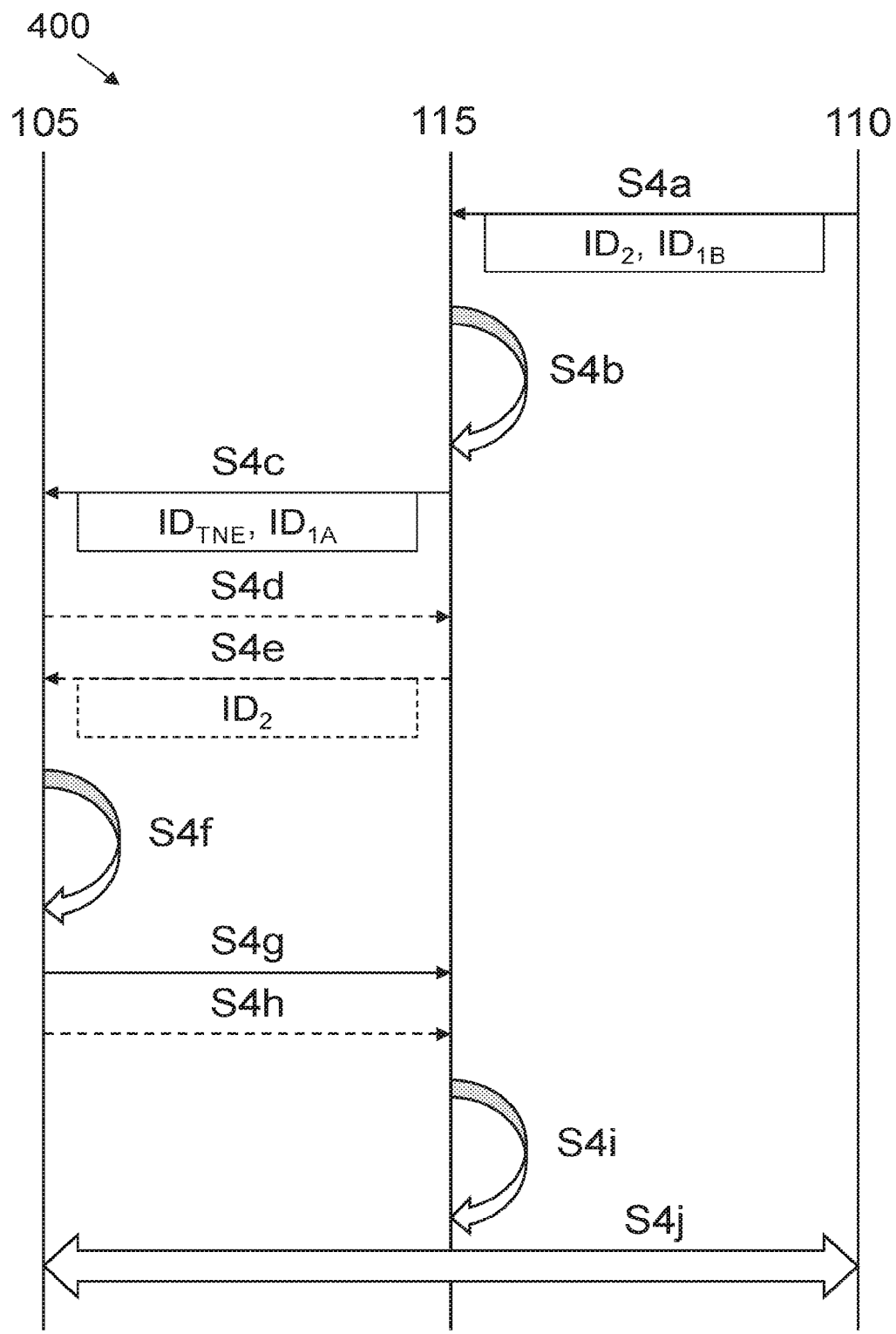
FIG. 4 shows a sequence diagram representing another example of a method.

Referring to FIG. 4, there is shown an example of a method 400 for use in establishing a telephony session between first and second telephony user devices. In this example, the method 300 is performed in the example network 100 described above with reference to FIG. 1. The method 300 may however be performed in the example network 200 described above with reference to FIG. 2.

In this example, the method 400 corresponds to the first user receiving an incoming call from the second telephony user device 110.

The first telephony user device 105 may periodically register with the telephony network equipment 115 and/or another entity in the telephony network 100. The first telephony user device 105 may, for example, provide the first and/or second telephony identifiers $ID_{1A}$, $ID_{1B}$ in intermittent registration messages.

At item S4a, the telephony network equipment 115 receives an incoming telephony session establishment request originating from the second telephony user device 110. In this specific example, the incoming telephony session establishment request comprises the further telephony identifier $ID_2$ as a calling party identifier and the second telephony identifier $ID_{1B}$ as a called party identifier. The telephony network equipment 115 may receive the telephony session establishment request from an entity other than the second telephony user device 110. For example, the telephony network equipment 115 may receive the telephony session establishment request from an IMS core, a SIP Registrar, etc. In some examples, the telephony network equipment 115 registers with a SIP Registrar as an endpoint for calls to the second telephony identifier $ID_{1B}$. One or more other devices may also be registered with the SIP Registrar as an endpoint for calls to the second telephony identifier $ID_{1B}$. As such, calls to the second telephony identifier $ID_{1B}$ may be forked by the SIP Registrar to endpoints registered against the second telephony identifier $ID_{1B}$.

At item S4b, the telephony network equipment 115 maps the second telephony identifier $ID_{1B}$ comprised in the incoming telephony session establishment request to the first telephony identifier $ID_{1A}$. For example, the telephony network equipment 115 may comprise a table in which the first telephony identifier $ID_{1A}$ is stored in association with the second telephony identifier $ID_{1B}$. In some examples, the incoming telephony session establishment request may comprise data useable by the telephony network equipment 115 to identify the second telephony identifier $ID_{1B}$, where such data may or may not comprise the second telephony identifier $ID_{1B}$ itself.

At item S4c, the telephony network equipment 115 transmits a telephony session establishment request to establish the telephony session 120 between the first telephony user device 105 and the telephony network equipment 115 via the signalling link. The telephony session 120 may or may not be established between the first telephony user device 105 and the telephony network equipment 115 at this stage. For example, the telephony network equipment 115 may hold off establishing the telephony session 120 until one or more predetermined events has occurred, as explained in more detail below. In this specific example, the telephony session establishment request comprises the first telephony identifier $ID_{1A}$ and the telephony network equipment identifier $ID_{TNE}$. The telephony network equipment 115 may transmit a telephony session establishment request to one or more further devices associated with the first user. For example, the first user may have one or more devices (such as SIP devices) registered in association with the first telephony identifier $ID_{1A}$ and/or the second telephony identifier $ID_{1B}$. The one or more devices may, for example, include a VoIP device (such as a smart business phone). In such cases, mobile-VoIP convergence may be provided.

At item S4d, the first telephony user device 105 transmits an originating entity identification request to the telephony network equipment 115 via the data link. The originating entity identification request relates to the telephony session establishment request received by the first telephony user device 105 from the telephony network equipment 115 at item S4c. In this example, the originating entity identification request serves as a lookup to identify the calling party prior to the first telephony user device 105 ringing to alert the first user to the incoming call. The originating entity identification request may, for example, comprise the first telephony identifier $ID_{1A}$ and/or the second telephony identifier $ID_{1B}$.

At item S4e, the telephony network equipment 115 transmits, in response to receiving the originating entity identification request at item S4d, a message to the first telephony user device 105 via the data link 125. In this specific example, the message comprises the further telephony identifier $ID_2$.

In other examples, the telephony network equipment 115 proactively transmits the message of item S4e to the first telephony user device 105 without waiting for, or needing to receive, the originating entity identification request from the first telephony user device 105. For example, although the telephony session establishment request of item S4c is transmitted before the message of S4e in this example, alternative approaches are possible. For example, the message of S4e could be transmitted to the first telephony user device 105 prior to, or at the same time as, the telephony session establishment request of item S4c being transmitted. As such, the originating entity identification request may not be transmitted at item S4d, since the first telephony user device 105 may already have been able to identify the calling party. However, the first telephony user device 105 may transmit an acknowledgement to the message of S4e in such an approach, which would then trigger the telephony network equipment 115 to send the telephony session establishment request of item S4c.

At item S4f, the first telephony user device 105 provides (for example displays) the further telephony identifier $ID_2$ and/or originating entity identification data based on the further telephony identifier $ID_2$ (for example a name of the second user) to the first user, for example via an in-call UI, in response to the receiving of the message by the first telephony user device 105 from the telephony network equipment 115 at item S4e. In some examples, the first telephony user device 105 does not display the telephony network equipment identifier $ID_{TNE}$ at this stage.

At item S4g, the first telephony user device 105 transmits to the telephony network equipment 115, via the signalling link, an acceptance message indicating acceptance of the telephony session establishment request received by the first telephony device 105 from the telephony network equipment 115 at item S4c.

At item S4h, the first telephony user device 105 transmits to the telephony network equipment 115, via the data link 125, a further acceptance message indicating acceptance of the telephony session establishment request received by the first telephony device 105 from the telephony network equipment 115 at item S4c. The acceptance message may be transmitted in response to the first user manually accepting the request to establish the telephony session following the provision of the further telephony identifier $ID_2$ and/or the originating entity identification data to the multi-persona user at item S4f. The further acceptance message may, for example, comprise the first telephony identifier $ID_{1A}$ and/or the second telephony identifier $ID_{1B}$.

In some examples, it may be undesirable for an incoming call associated with the second persona to be sent to a voicemail system associated with the first persona. This may occur if, for example, the first user is uncontactable or if they do not answer the incoming call. In some examples, it may not be possible to determine from the acceptance message of item S4g whether the call has been answered by the multi-persona user or by a voicemail system. The further acceptance message of item S4h may be used to indicate that the first user, rather than another system (such as a voicemail system) or another user (if the call were forwarded by the first telephony user device 105), has answered the call. Where the first account of the first user is known not to have a terminating voicemail system, processing associated with the further acceptance message of item S4h may be omitted for incoming calls.

Further, if the user has no data link connectivity when they received the call, their phone would ring, but they would be unable to send the further acceptance message of item S4h and the call may not connect. The originating entity identification request of item S4d may be used to verify that the first telephony user device 105 does indeed have data link connectivity, making the chance of the user experiencing such a non-connecting call negligible.

At item S4i, the telephony network equipment 115 determines whether both the acceptance message of item S4g and the further acceptance message of item S4h have been received. In this specific example, the telephony network equipment 115 only establishes the telephony session between the first and second telephony user devices 105, 110 in response to receiving both the acceptance message of item S4g and the further acceptance message of item S4h. In such examples, if the telephony network equipment 115 only receives the acceptance message of item S4g and not also the further acceptance message of item S4h, then the telephony network equipment 115 does not establish the telephony session between the first and second telephony user devices 105, 110. This may occur when, for example, the call is forwarded to a voicemail system but the first user has not manually accepted the call on the first telephony user device 105. In such cases, where the further acceptance message of item S4h is not received, the telephony network equipment 115 may transmit a cancellation message to the first telephony user device 105 to cause the telephony session establishment procedure to be terminated. The cancellation message may, for example, be a SIP BYE message. Where the telephony network equipment 115 receives the telephony session establishment request of item S4a from a SIP Registrar, the telephony network equipment 115 may transmit a message to the SIP Registrar to indicate that the call has not been answered. The message to the SIP Registrar may, for example, be a SIP 4xx message. In such cases, where the SIP Registrar had forked the incoming call to another device associated with the first user, and where the first user had accepted the call on the other device, the telephony session may be established between the second telephony user device 110 and the other device. In other examples, the telephony network equipment 115 may establish the telephony session between the first and second telephony user devices 105, 110 even if the further acceptance message of item S4h has not been received, for example if the first telephony device 105 is not configured to transmit such further acceptance messages.

At item S4j, assuming the acceptance message of item S4g and the further acceptance message of item S4h are both received, the telephony network equipment 115 establishes the telephony session between the first and second telephony user devices 105, 110. Where, at item S4c, the telephony network equipment 115 transmitted the telephony session establishment request to one or more further devices associated with the first user, the telephony network equipment 115 may transmit one or more cancellation requests to the one or more further devices where the first user has accepted the call on the first telephony user device 105. Where the telephony network equipment 115 receives the telephony session establishment request of item S4a from a SIP Registrar, the telephony network equipment 115 may transmit an acceptance message to the SIP Registrar. The acceptance message may, for example, be a SIP 200 OK message. The SIP Registrar may then send a cancellation message to any other devices to which the SIP Registrar sent a telephony session establishment request, on the basis that the call has been accepted by another device.

As such, for incoming calls to the second telephony identifier $ID_{1B}$, the telephony network equipment 115, which serves the second telephony identifier $ID_{1B}$, receives the call. A multi-persona function is triggered at the telephony network equipment 115. The telephony network equipment 115 may fork the call by sending an incoming telephony session establishment request with the called party identifier being the first telephony identifier $ID_{1A}$ and the calling party identifier being the telephony network equipment identified $ID_{TNE}$. The first telephony user device 105 receives the call and identifies the telephony network equipment identified $ID_{TNE}$ in the caller ID. In some examples, the function handling the call on the first telephony user device 105 does not allow the first telephony user device 105 to ring at this stage. Instead, the function sends an originating entity identification request to the telephony network equipment 115 to determine the identity of the calling party. The originating entity identification request is transmitted via the data link 125. In response to receiving data identifying the calling party from the telephony network equipment 115, the first telephony user device 105 displays the further telephony identifier $ID_2$ and/or identification data associated with the second user. In some examples, the telephony user device 105 does not display the telephony network equipment identifier $ID_{TNE}$. In conjunction with displaying the further telephony identifier $ID_2$ and/or the associated identification data, the first telephony user device 105 rings to alert the first user to the incoming call.

References herein to first data being communicated "in-band" with respect to second data are intended to cover the first and second data being transmitted in relation to the same link (for example a signalling link or a data link), during session setup and/or after a session is established. References herein to first data being communicated "out-of-band" or "OTT" with respect to second data are intended to cover the first and second data being transmitted in relation to different links (for example a signalling link and a data link), during session setup and/or after a session is established.

The above are to be understood as illustrative examples. Further examples are envisaged.

Examples described above relate to establishing a telephony session between the first and second telephony user devices. Other examples may relate to enabling another type of telecommunication to be conducted between the first and second telephony user devices. Examples of other types of telecommunication include, but are not limited to, Short Messaging Service (SMS) messaging and Multimedia Messaging Service (MMS) messaging. In such other examples, the first user may be able to send and/or receive SMS and/or MMS messages in relation to multiple different personas using a single telephony user device. As such, various measures (for example methods, apparatuses and computer programmes) are provided for use in enabling first and second telephony user devices to conduct telecommunications in a telephony network. Telecommunications data (for example an SMS message or an MMS message) is transmitted or received via a first connection (for example a circuit-switched telephony connection) between the first telephony user device and telephony network equipment in the telephony network. A message is transmitted or received via a second connection (for example a packet-switched data connection) that is between the first telephony user device and telephony network equipment and that is separate to the first connection.

Examples are described above in which acknowledgement messages are transmitted. As an alternative to use of acknowledgment messages, a small delay could be applied with predetermined failure behaviour used as needed.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method for use in establishing a telephony session between first and second telephony devices in a telephony network, the first telephony device being associated with a multi-persona user having first and second personas, the method comprising, at telephony network equipment in the telephony network:
    receiving, from the second telephony device, a telephony session establishment request relating to the second persona;
    transmitting, to the first telephony device over a signalling link, a telephony session establishment request, the telephony session establishment request comprising a first telephony identifier associated with the first persona and a calling party identifier associated with the telephony network equipment; and
    transmitting, to the first telephony device via a data link that is separate to the signalling link, a message comprising: (i) data useable by the first telephony device to determine that the transmitted telephony session establishment request relates to the second persona; and/or (ii) data useable by the first telephony device to identify the second telephony device,
    wherein the second persona is associated with a second telephony identifier and wherein the message is transmitted before the telephony session is established.

2. The method of claim 1, wherein the received telephony session establishment request comprises data useable to identify the second telephony identifier.

3. The method of claim 2, wherein the data useable to identify the second telephony identifier comprises the second telephony identifier.

4. The method of claim 1, comprising mapping the second telephony identifier to the first telephony identifier.

5. The method of claim 1, wherein the data useable by the first telephony device to determine that the transmitted telephony session establishment request relates to the second persona comprises data useable by the first telephony device to identify the second telephony identifier.

6. The method of claim 1, wherein the telephony network equipment transmits the message to the first telephony user device in response to the telephony network equipment receiving, via the data link, an originating entity identification request from the first telephony user device, the originating entity identification request relating to the transmitted telephony session establishment request.

7. The method of claim 1, comprising determining whether or not an acceptance message has been received from the first telephony device via the data link, the acceptance message indicating acceptance of the transmitted telephony session establishment request by the multi-persona user.

8. The method of claim 7, comprising causing the telephony session to be established in response to determining that the acceptance message has been received.

9. A method for use in establishing a telephony session between first and second telephony devices in a telephony network, the first telephony device being associated with a multi-persona user having first and second personas, the method comprising, at the first telephony device:
    receiving, from telephony network equipment in the telephony network over a signalling link, a telephony session establishment request comprising a first telephony identifier associated with the first persona and a calling party identifier associated with the telephony network equipment; and
    receiving, from the telephony network equipment via a data link that is separate to the signalling link, a message comprising: (i) data useable by the first telephony device to determine that the telephony session relates to the second persona; and/or (ii) data useable by the first telephony device to identify the second telephony device,
    wherein the second persona is associated with a second telephony identifier and wherein the message is received before the telephony session is established.

10. The method of claim 9, wherein the data useable by the first telephony device to determine that the received telephony session establishment request relates to the second persona comprises data useable by the first telephony device to identify the second telephony identifier.

11. The method of claim 9, comprising transmitting, to the telephony network equipment, via the data link, an originating entity identification request, the originating entity identification request relating to the received telephony session establishment request.

12. The method of claim 9, comprising transmitting, to the telephony network equipment, via the data link, an acceptance message indicating acceptance of the received telephony session establishment request by the multi-persona user.

13. Apparatus comprising one or more processors and one or more memories, the one or more memories comprising one or more computer programs comprising computer-readable instructions, the one or more processors being configured to execute the computer-readable instructions to perform a method according to claim 1.

14. Apparatus comprising one or more processors and one or more memories, the one or more memories comprising one or more computer programs comprising computer-readable instructions, the one or more processors being configured to execute the computer-readable instructions to perform a method according to claim 10.

\* \* \* \* \*